United States Patent
Burgard et al.

(10) Patent No.: US 11,760,379 B2
(45) Date of Patent: Sep. 19, 2023

(54) NAVIGATING AN AUTONOMOUS VEHICLE THROUGH AN INTERSECTION

(71) Applicant: Toyota Research Institute, Inc., Los Altos, CA (US)

(72) Inventors: Wolfram Burgard, Mountain View, CA (US); Ryan W. Wolcott, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 354 days.

(21) Appl. No.: 17/145,767

(22) Filed: Jan. 11, 2021

(65) Prior Publication Data

US 2022/0219725 A1    Jul. 14, 2022

(51) Int. Cl.
*B60W 60/00* (2020.01)
*G06V 20/56* (2022.01)

(52) U.S. Cl.
CPC ....... *B60W 60/0011* (2020.02); *G06V 20/588* (2022.01); *B60W 2420/403* (2013.01);
(Continued)

(58) Field of Classification Search
CPC ......... B60W 60/0011; B60W 2552/53; B60W 2552/10; B60W 2554/4045;
(Continued)

(56) References Cited

U.S. PATENT DOCUMENTS 10,008,035 B1 * 6/2018 Redden .................. G06T 7/337
10,860,115 B1 * 12/2020 Tran ....................... B64D 47/08
(Continued)

FOREIGN PATENT DOCUMENTS

CN    103593535 A  *  2/2014
CN    110352450 B  * 11/2021  ......... B60R 21/0134
WO    2020016038 A1    1/2020

OTHER PUBLICATIONS

Meyer et al., "Anytime Lane-Level Intersection Estimation Based on Trajectories of Other Traffic Participants," 2019 IEEE Intelligent Transportation Systems Conference (ITSC), Auckland, New Zealand, pp. 3122-3129, 2019.
(Continued)

*Primary Examiner* — Richard A Goldman
(74) *Attorney, Agent, or Firm* — Christopher G. Darrow; Darrow Mustafa PC (57) ABSTRACT

An autonomous vehicle can be navigated through an intersection. Topological information about the intersection can be obtained. The topological information can include, for example, a count of a number of lanes on roads associated with the intersection, information about an entrance point to the intersection, or information about an exit point from the intersection. Based on the topological information, context information about a candidate trajectory through the intersection can be obtained. For example, the context information can be based on a current time or information about a position of an object with respect to the topological information. Based on the context information, an existence of an advantage to change an actual trajectory of the autonomous vehicle can be determined. In response to a determination of the existence of the advantage, a change to the actual trajectory of the autonomous vehicle can be caused to occur.

20 Claims, 4 Drawing Sheets (52) U.S. Cl.
CPC ..... *B60W 2552/10* (2020.02); *B60W 2552/53* (2020.02); *B60W 2554/4045* (2020.02); *B60W 2554/4049* (2020.02)

(58) Field of Classification Search
CPC .... B60W 2554/4049; B60W 2420/403; G06V 20/588
USPC .......................................................... 701/23
See application file for complete search history.

(56) References Cited

U.S. PATENT DOCUMENTS

| | | | | |
|---|---|---|---|---|
| 10,955,855 B1* | 3/2021 | Tran | ..................... | G05D 1/0246 |
| 2003/0229441 A1* | 12/2003 | Pechatnikov | ...... | G01C 21/3667 |
| | | | | 701/411 |
| 2007/0093945 A1* | 4/2007 | Grzywna | ............. | G01C 21/005 |
| | | | | 701/23 |
| 2007/0138347 A1* | 6/2007 | Ehlers | .................... | G01C 21/34 |
| | | | | 246/1 R |
| 2007/0259634 A1* | 11/2007 | MacLeod | ......... | G08G 1/096775 |
| | | | | 455/414.1 |
| 2008/0303696 A1* | 12/2008 | Aso | ........................ | G08G 1/161 |
| | | | | 340/933 |
| 2010/0324816 A1* | 12/2010 | Highstrom | ........... | G01C 21/367 |
| | | | | 701/533 |
| 2011/0123961 A1* | 5/2011 | Staplin | ................... | G09B 9/052 |
| | | | | 434/64 |
| 2012/0101862 A1* | 4/2012 | Stanton | ................ | G06Q 10/063 |
| | | | | 705/7.11 |
| 2014/0074388 A1* | 3/2014 | Bretzigheimer | ... | B62D 15/0275 |
| | | | | 701/117 |
| 2014/0362807 A1* | 12/2014 | Bhatnagar | ........... | H04W 12/068 |
| | | | | 370/329 |
| 2015/0032366 A1* | 1/2015 | Man | ..................... | H04W 4/024 |
| | | | | 701/414 |
| 2015/0166062 A1* | 6/2015 | Johnson | ................ | B60W 10/20 |
| | | | | 701/41 |
| 2015/0197246 A1* | 7/2015 | Nagasaka | ............ | G05D 1/0231 |
| | | | | 701/1 |
| 2016/0170410 A1* | 6/2016 | Ichikawa | ............... | G05D 1/021 |
| | | | | 701/26 |
| 2016/0325753 A1* | 11/2016 | Stein | .................. | B60G 17/0165 |
| 2017/0113799 A1* | 4/2017 | Kovac | ..................... | B64C 39/02 |
| 2017/0364083 A1* | 12/2017 | Yang | .................. | G01C 21/3407 |
| 2018/0026897 A1* | 1/2018 | Eller | ..................... | H04L 47/127 |
| | | | | 370/234 |
| 2018/0075745 A1* | 3/2018 | Buburuzan | ............ | G08G 1/162 |
| 2018/0376317 A1* | 12/2018 | Kim | ....................... | H04L 69/24 |
| 2019/0317937 A1* | 10/2019 | Ghosh | .................. | G06F 16/248 |
| 2019/0369637 A1* | 12/2019 | Shalev-Shwartz | .......................... | G01C 21/3415 |
| 2019/0377352 A1* | 12/2019 | Weißwange | ...... | B60W 60/0027 |
| 2019/0391580 A1* | 12/2019 | Di Cairano | ............ | G06N 5/022 |
| 2020/0159225 A1* | 5/2020 | Zeng | .................. | G01C 21/3453 |
| 2020/0202714 A1* | 6/2020 | Gesch | .............. | G08G 1/096725 |
| 2020/0379484 A1* | 12/2020 | Omari | ..................... | G06F 16/29 |
| 2021/0089048 A1* | 3/2021 | Tran | ..................... | B60R 25/257 |
| 2021/0107566 A1* | 4/2021 | Seegmiller | ......... | G01C 21/3626 |
| 2021/0109536 A1* | 4/2021 | Oh | ......................... | B60W 30/09 |
| 2021/0166474 A1* | 6/2021 | Behar | ..................... | G06V 20/56 |
| 2021/0192975 A1* | 6/2021 | Spence | .............. | G01C 21/3647 |
| 2021/0271245 A1* | 9/2021 | Bradley | ............... | G05D 1/0088 |
| 2021/0403045 A1* | 12/2021 | Lin | .................. | B60W 60/0023 |
| 2022/0032952 A1* | 2/2022 | Lienke | ............... | B60W 60/0011 |
| 2022/0105928 A1* | 4/2022 | Foil | ........................ | B60W 30/09 |
| 2022/0144309 A1* | 5/2022 | Hwu | .................. | B60W 60/0011 |
| 2022/0171401 A1* | 6/2022 | Usman | .................. | B60W 40/09 |
| 2022/0176995 A1* | 6/2022 | Subramanian | ...... | B60W 60/001 |
| 2022/0188667 A1* | 6/2022 | Burisch | .................. | G08G 1/166 |
| 2022/0219725 A1* | 7/2022 | Burgard | ............... | G06V 20/588 |
| 2022/0227390 A1* | 7/2022 | Wang | .................. | B60W 60/0011 |
| 2022/0319312 A1* | 10/2022 | Mintz | .................... | G07B 15/06 |
| 2022/0402485 A1* | 12/2022 | Kobilarov | ....... | B60W 60/00274 |
| 2023/0029533 A1* | 2/2023 | Kim | .................. | B60W 50/0097 |
| 2023/0049845 A1* | 2/2023 | Tran | ..................... | G08G 5/0052 |

OTHER PUBLICATIONS

Best et al., "AutonoVi: Autonomous Vehicle Planning with Dynamic Maneuvers and Traffic Constraints," 2017 IEEE/RSJ International Conference on Intelligent Robots and Systems (IROS), Vancouver, BC, pp. 2629-2636, 2017.

Guan et al., "Centralized Conflict-free Cooperation for Connected and Automated Vehicles at Intersections by Proximal Policy Optimization," pp. 1-9, arXiv:1912.08410v1 [cs.RO] Dec. 18, 2019.

De Beaucorps et al., "Decision-making for automated vehicles at intersections adapting human-like behavior," 2017 IEEE Intelligent Vehicles Symposium (IV), Los Angeles, CA, pp. 212-217, 2017.

Yu et al., "Risk Assessment and Planning with Bidirectional Reachability for Autonomous Driving," pp. 1-7, arXiv:1909 08059V1 [cs RO] Sep. 17, 2019.

Beeson et al., "Towards Autonomous Topological Place Detection Using the Extended Voronoi Graph," 2005 IEEE International Conference on Robotics and Automation, Barcelona, Spain, pp. 4373-4379, 2005.

Amini et al., "Variational End-to-End Navigation and Localization," 2019 International Conference on Robotics and Automation (ICRA), Montreal, QC, Canada, pp. 8958-8964, 2019.

* cited by examiner

NAVIGATING AN AUTONOMOUS VEHICLE THROUGH AN INTERSECTION

TECHNICAL FIELD

The disclosed technologies are directed to navigating an autonomous vehicle through an intersection. Specifically, the disclosed technologies are directed to navigating, based on topological information about an intersection and context information about a candidate trajectory through the intersection, an autonomous vehicle through the intersection.

BACKGROUND

A task of planning a trajectory for an autonomous vehicle to move from an origination point to a destination point can require more information than a comparable task of planning a trajectory for a conventional vehicle using a turn-by-turn navigation system. Additional information required by the task of planning the trajectory for an autonomous vehicle can include, for example, location information at a degree of precision for a specific lane of a road, information about expected objects (e.g., traffic) along the trajectory, information to determine predicted trajectories for actual objects detected along the trajectory, and the like. Often, the task of planning the trajectory for an autonomous vehicle can include determining a selection of a trajectory from a set of candidate trajectories.

SUMMARY

An autonomous vehicle can be navigated through an intersection. Topological information about the intersection can be obtained. The topological information can include, for example, a count of a number of lanes on roads associated with the intersection, information about an entrance point to the intersection, or information about an exit point from the intersection. Based on the topological information, context information about a candidate trajectory through the intersection can be obtained. For example, the context information can be based on a current time or information about a position of an object with respect to the topological information. Based on the context information, an existence of an advantage to change an actual trajectory of the autonomous vehicle can be determined. In response to a determination of the existence of the advantage, a change to the actual trajectory of the autonomous vehicle can be caused to occur.

In a first alternative implementation, the topological information can be obtained by: (1) receiving, from a sensor disposed on one or more of the autonomous vehicle or another object, information about the intersection and (2) determining, based on the information about the intersection, the topological information. Additionally, the topological information, having been determined, can be stored in a memory. The memory can be disposed in one or more of the autonomous vehicle or a cloud computing platform.

In a second alternative implementation, the topological information can be obtained by retrieving the topological information from a memory. The memory can be disposed in one or more of the autonomous vehicle or a cloud computing platform. In a variation, the topological information can further be obtained by: (1) receiving, from a sensor disposed on at least one of the autonomous vehicle or another object, additional information about the intersection; (2) determining, based on the additional information about the intersection, additional topological information; and (3) revising the topological information to incorporate the additional topological information. Additionally, in this variation, the topological information, having been revised, can be stored in a memory. Again, the memory can be disposed in one or more of the autonomous vehicle or a cloud computing platform.

In a third alternative implementation, the context information can be obtained by retrieving the context information from a memory. The memory can be disposed in one or more of the autonomous vehicle or a cloud computing platform. Additionally, for example, the memory can also store the topological information.

In a fourth alternative implementation, the context information can be obtained by determining the context information. In a realization of the fourth alternative implementation, the context information can be determined by: (1) obtaining a position of an object within a threshold distance to the autonomous vehicle and (2) determining information about the position of the object with respect to the topological information. In a specific realization, the position of the object can be obtained by receiving, from a sensor disposed on one or more of the autonomous vehicle or another object, the position of the object. Additionally, in the realization, a trajectory of the object can be determined. Additionally, the context information, having been obtained, can be stored in a memory. The memory can be disposed in one or more of the autonomous vehicle or a cloud computing platform. Additionally, for example, the memory can also store the topological information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A specific task of planning a trajectory for an autonomous vehicle to navigate through an intersection can require more information than a general task of planning a trajectory for the autonomous vehicle to move from an origination point to a destination point. For example, not only can location information be at a degree of precision for a specific lane of a road, but also additional information about the specific lane (e.g., vehicles are allowed to make left turns or to go straight, vehicles are allowed only to go straight, etc.), topological information about the intersection (e.g., a count of a number of lanes on roads associated with the intersection, information about an entrance point to the intersection, information about an exit point from the intersection, etc.), or both can be required. For example, information to determine predicted trajectories for actual objects detected along the trajectory of the autonomous vehicle can require that several predicted trajectories be determined to allow for possible changes in paths of travel of the actual objects as they navigate through the intersection. For example, determining a selection of a trajectory, for the autonomous vehicle, from a set of candidate trajectories can require that a determination of the selection be based on the additional information about the specific lane, the topological information about the intersection, the several predicted trajectories for the actual objects detected, etc.

The disclosed technologies are directed to navigating an autonomous vehicle through an intersection. Topological information about the intersection can be obtained. The topological information can include, for example, a count of a number of lanes on roads associated with the intersection, information about an entrance point to the intersection, information about an exit point from the intersection, or the like. The intersection can be, for example, a conventional intersection of two roads, an intersection of more than two roads, a roundabout, a traffic circle, or the like. Based on the topological information, context information about a candidate trajectory through the intersection can be obtained. The context information can include, for example, a current time (e.g., Tuesday at 10:00 am), information about a position of an object with respect to the topological information in which the object can be within a threshold distance of the autonomous vehicle (e.g., (1) another vehicle is in front of the autonomous vehicle in a lane in which vehicles are allowed to make left turns or to go straight and, on Tuesdays at 10:00 am, 70 percent of vehicles in this lane make left turns and (2) vehicles in a lane to the right of the lane in which the autonomous vehicle is currently located are allowed only to go straight), or the like. Based on the context information, an existence of an advantage to change an actual trajectory of the autonomous vehicle can be determined (e.g., the desired trajectory for the autonomous vehicle is to go straight and being in the lane to the right of the lane in which the autonomous vehicle is currently located may allow the autonomous vehicle to go straight without a need to wait for the other vehicle in front of the autonomous vehicle possibly to make a left turn). In response to a determination of the existence of the advantage, a change to the actual trajectory of the autonomous vehicle can be caused to occur.

Figure 1:
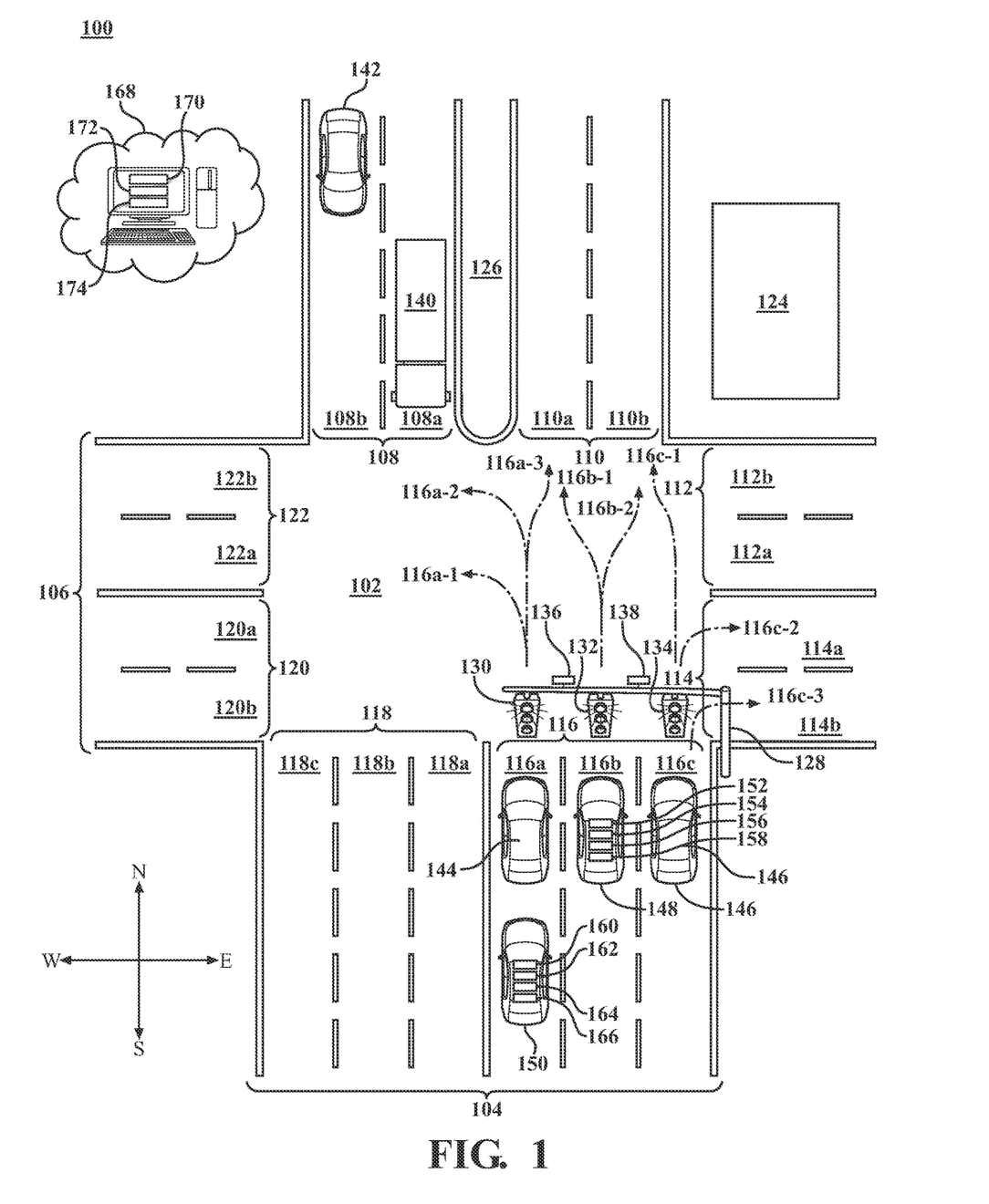
FIG. 1 is a diagram that illustrates an example of an environment for navigating an autonomous vehicle through an intersection, according to the disclosed technologies.

FIG. 1 is a diagram that illustrates an example of an environment 100 for navigating an autonomous vehicle through an intersection 102, according to the disclosed technologies. For example, the intersection 102 can be of a first road 104 and a second road 106. For example, the first road 104 can be disposed along a line of longitude and the second road 106 can be disposed along a line of latitude. For example: (1) a north entrance point 108 to the intersection 102 can include a left lane 108a and a right lane 108b; (2) a north exit point 110 from the intersection 102 can include a left lane 110a and a right lane 110b; (3) an east entrance point 112 to the intersection 102 can include a left lane 112a and a right lane 112b; (4) an east exit point 114 from the intersection 102 can include a left lane 114a and a right lane 114b; (5) a south entrance point 116 to the intersection 102 can include a left lane 116a, a center lane 116b, and a right lane 116c; (6) a south exit point 118 from the intersection 102 can include a left lane 118a, a center lane 118b, and a right lane 118c; (7) a west entrance point 120 to the intersection 102 can include a left lane 120a and a right lane 120b; and (8) a west exit point 122 from the intersection 102 can include a left lane 122a and a right lane 122b. For example, from the left lane 116a, an actual trajectory of an autonomous vehicle can be along: (1) a first candidate trajectory 116a-1 to the left lane 122a, (2) a second candidate trajectory 116a-2 to the right lane 122b, or (3) a third candidate trajectory 116a-3 to the left lane 110a. For example, from the center lane 116b, an actual trajectory of an autonomous vehicle can be along: (1) a first candidate trajectory 116b-1 to the left lane 110a or (2) a second candidate trajectory 116b-2 to the right lane 110b. For example, from the right lane 116c, an actual trajectory of an autonomous vehicle can be along: (1) a first candidate trajectory 116c-1 to the right lane 110b, (2) a second candidate trajectory 116c-2 to the left lane 114a, or (3) a third candidate trajectory 116c-3 to the right lane 114b.

For example, the environment 100 can include a warehouse 124 located east of the first road 104, north of the intersection 102. For example, the first road 104, north of the intersection 102, can include a median 126. For example, the intersection 102 can include a post and beam cantilever 128 that can support a first traffic light 130, a second traffic light 132, a third traffic light 134, a first sensor 136, and a first wireless communications device 138. For example, in the environment 100 there can be a semi-trailer truck 140, a first vehicle 142, a second vehicle 144, a third vehicle 146, a first autonomous vehicle 148, and a second autonomous vehicle 150. For example, the first autonomous vehicle 148 can have a first processor 152, a first memory 154, a second sensor 156, and a second wireless communications device 158. For example, the second autonomous vehicle 150 can have a second processor 160, a second memory 162, a third sensor 164, and a third wireless communications device 166. For example, the environment 100 can include a cloud computing platform 168. For example, the cloud computing platform 168 can include a third processor 170, a third memory 172, and a fourth wireless communications device 174.

Figure 2:
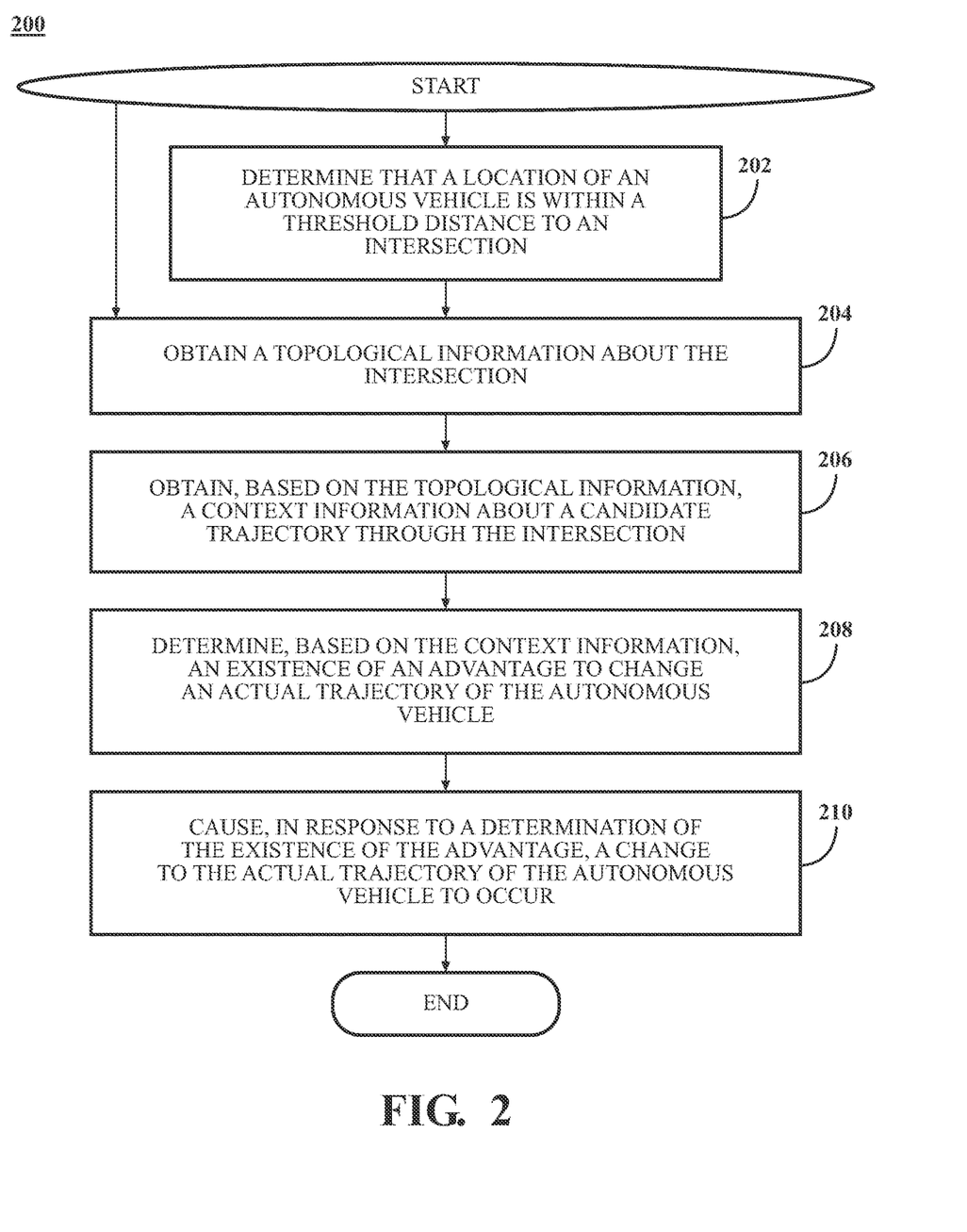
FIG. 2 is a flow diagram that illustrates an example of a method that is associated with navigating an autonomous vehicle through an intersection, according to the disclosed technologies.

FIG. 2 is a flow diagram that illustrates an example of a method 200 that is associated with navigating an autonomous vehicle through an intersection, according to the disclosed technologies.

In the method 200, at an operation 202, a processor can determine that a location of the autonomous vehicle is within a threshold distance to the intersection. For example, the threshold distance can be 100 meters.

At an operation 204, the processor can obtain topological information about the intersection. The topological information can include, for example, one or more of a count of a number of lanes on roads associated with the intersection, information about an entrance point to the intersection, or information about an exit point from the intersection. For example, with reference to FIG. 1, the topological information can include that the south entrance point 116 to the intersection 102 includes the left lane 116a, the center lane 116b, and the right lane 116c. For example, the topological information can further include, at a first time (e.g., an earlier date), that: (1) in the left lane 116a, vehicles are allowed to make left turns or to go straight (LS); (2) in the center lane 116b, vehicles are allowed only to go straight (SO); and (3) in the right lane 116c, vehicles are allowed to make right turns or to go straight (RS). This can be expressed as a first pattern: LS/SO/RS. For example, the topological information can further include, at a second time (e.g., a later date), that: (1) in the left lane 116*a*, vehicles are allowed only to make left turns (LO); (2) in the center lane 116*b*, vehicles are allowed to make left turns or to go straight (LS); and (3) in the right lane 116*c*, vehicles are allowed to make right turns or to go straight (RS). This can be expressed as a second pattern: LO/LS/RS. In this manner, in these examples, permissible trajectories for vehicles in the left lane 116*a* and in the center lane 116*b* at the second time (e.g., the later date) are different from permissible trajectories for vehicles in the left lane 116*a* and in the center lane 116*b* at the first time (e.g., the earlier date).

In a first alternative implementation, the topological information can be obtained by: (1) receiving, from a sensor disposed on one or more of the autonomous vehicle or another object, information about the intersection and (2) determining, based on the information about the intersection, the topological information. For example, the sensor can include one or more of the second sensor 156 of the first autonomous vehicle 148 or the first sensor 136 supported by the post and beam cantilever 128. For example, the first processor 152 of the first autonomous vehicle 148 can receive, from the second sensor 156 of the first autonomous vehicle 148, a position of the second vehicle 144 and a position of the third vehicle 146. For example, the first processor 152 can determine, based on the position of the second vehicle 144 and the position of the third vehicle 146, a location of the left lane 116*a* and a location of the right lane 116*c*. Additionally, in the first alternative implementation, the topological information, having been determined, can be stored in a memory. The memory can be disposed in one or more of the autonomous vehicle or a cloud computing platform. For example, the memory can include one or more of the first memory 154 of the first autonomous vehicle 148 or the third memory 172 of the cloud computing platform 168.

In a second alternative implementation, the topological information can be obtained by retrieving the topological information from a memory. The memory can be disposed in one or more of the autonomous vehicle or a cloud computing platform. For example, the memory can include one or more of the first memory 154 of the first autonomous vehicle 148 or the third memory 172 of the cloud computing platform 168. For example, the first processor 152 of the first autonomous vehicle 148 can retrieve, from the third memory 172, that the south entrance point 116 to the intersection 102 includes the left lane 116*a*, the center lane 116*b*, and the right lane 116*c*. In a variation of the second alternative implementation, the topological information can further be obtained by: (1) receiving, from a sensor disposed on at least one of the autonomous vehicle or another object, additional information about the intersection; (2) determining, based on the additional information about the intersection, additional topological information; and (3) revising the topological information to incorporate the additional topological information. For example, the sensor can include one or more of the second sensor 156 of the first autonomous vehicle 148 or the first sensor 136 supported by the post and beam cantilever 128. For example, the first processor 152 of the first autonomous vehicle 148 can receive, from the first sensor 136, that the first traffic light 130 produces: (1) a first signal that indicates that vehicles are allowed to go in any direction and (2) a second signal that indicates that vehicles are allowed only to make left turns. The first processor 152 can determine, based on this information, that: (1) in the left lane 116*a*, vehicles are allowed to make left turns or to go straight (LS); (2) in the center lane 116*b*, vehicles are allowed only to go straight (SO); and (3) in the right lane 116*c*, vehicles are allowed to make right turns or to go straight (RS) (i.e., the first pattern: LS/SO/RS). The first processor 152 can revise the topological information to include this additional topological information. Additionally, in this variation, the topological information, having been revised, can be stored in a memory. The memory can be disposed in one or more of the autonomous vehicle or a cloud computing platform. For example, the memory can include one or more of the first memory 154 of the first autonomous vehicle 148 or the third memory 172 of the cloud computing platform 168.

Returning to FIG. 2, at an operation 206, the processor can obtain, based on the topological information, context information about a candidate trajectory through the intersection. For example, the context information can be based on one or more of a current time or information about a position of an object with respect to the topological information. The object can be within a threshold distance to the autonomous vehicle. For example, the threshold distance to the autonomous vehicle can be 300 meters. For example, the context information can be based on historical information related to the intersection and vehicles that have navigated through the intersection.

With reference to FIG. 1, in a first example, the second processor 160 of the second autonomous vehicle 150 can obtain, based on the topological information, context information that: (1) the current time is Tuesday at 10:00 am; (2) the second vehicle 144 is in front of the second autonomous vehicle 150 in the left lane 116*a*; (3) in the left lane 116*a*, vehicles are allowed to make left turns or to go straight (LS) (e.g., the first pattern: LS/SO/RS); (4) on Tuesdays at 10:00 am, 70 percent of vehicles in the left lane 116*a* make left turns; and (5) in the center lane 116*b*, vehicles are allowed only to go straight (SO) (e.g., the first pattern: LS/SO/RS).

In a second example, the first processor 152 of the first autonomous vehicle 148 can obtain, based on the topological information, context information that: (1) the second vehicle 144 is in the left lane 116*a*; (2) in the left lane 116*a*, vehicles are allowed only to make left turns (LO) (e.g., the second pattern: LO/LS/RS); and (3) the actual trajectory of 50 percent of vehicles in the left lane 116*a* is along the second candidate trajectory 116*a*-2 to the right lane 122*b* (rather than along the first candidate trajectory 116*a*-1 to the left lane 122*a*).

In a third example, the first processor 152 of the first autonomous vehicle 148 can obtain, based on the topological information, context information that: (1) the warehouse 124 is located east of the first road 104, north of the intersection 102; (2) the first road 104, north of the intersection 102, includes the median 126; (3) the semi-trailer truck 140 is in the left lane 108*a*; and (4) 20 percent of the time in which a semi-trailer truck 140 is in the left lane 108*a*, the semi-trailer truck 140 makes a U-turn to the right lane 110*b*.

In a third alternative implementation, the context information can be obtained by retrieving the context information from a memory. The memory can be disposed in one or more of the autonomous vehicle or a cloud computing platform. Additionally, for example, the memory can also store the topological information.

In a fourth example, the first processor 152 of the first autonomous vehicle 148 can have retrieved, from the first memory 154 of the first autonomous vehicle 148, that the topological information about the south entrance point 116 to the intersection 102 includes the first pattern (i.e., LS/SO/RS). Next, the first processor 152 can receive, from the first sensor 136 supported by the post and beam cantilever 128, that: (1) the first traffic light 130 produces a signal that indicates that vehicles are allowed only to make left turns and (2) the second traffic light 132 produces: (a) a first signal that indicates that vehicles are allowed to go in any direction and (b) a second signal that indicates that vehicles are allowed only to make left turns. The first processor 152 can determine, based on this information, that: (1) in the left lane 116a, vehicles are allowed only to make left turns (LO); (2) in the center lane 116b, vehicles are allowed to make left turns or to go straight (LS); and (3) in the right lane 116c, vehicles are allowed to make right turns or to go straight (RS) (i.e., the second pattern: LO/LS/RS). The first processor 152 can revise the topological information to include this additional topological information. However, because the context information stored in the first memory 154 may be based on the topological information associated with the first pattern (i.e., LS/SO/RS), the first processor 152 can cause, in response to the revision to the topological information, context information associated with an intersection that has the second pattern (i.e., LO/LS/RS) to be retrieved from the third memory 172 of the cloud computing platform 168.

In a fourth alternative implementation, the context information can be obtained by determining the context information. In a realization of the fourth alternative implementation, the context information can be determined by: (1) obtaining a position of an object within a threshold distance to the autonomous vehicle and (2) determining information about the position of the object with respect to the topological information. In a specific realization, the position of the object can be obtained by receiving, from a sensor disposed on one or more of the autonomous vehicle or another object, the position of the object. For example, the threshold distance to the autonomous vehicle can be 300 meters. Additionally, in the realization, a trajectory of the object can be determined. Additionally, in the fourth alternative implementation, the context information, having been obtained, can be stored in a memory. The memory can be disposed in one or more of the autonomous vehicle or a cloud computing platform. Additionally, for example, the memory can also store the topological information.

In a fifth example, the first processor 152 of the first autonomous vehicle 148 can have obtained that the topological information about the south entrance point 116 to the intersection 102 includes the second pattern (i.e., LO/LS/RS). The first processor 152 can receive, from the second sensor 156 of the first autonomous vehicle 148 or the first sensor 136 supported by the post and beam cantilever 128, the position of the first vehicle 142. The first processor 152 can determine that the first vehicle 142 is in the right lane 108b, 100 meters from the north entrance point 108 to the intersection 102. Additionally, the first processor 152 can determine that the trajectory of first vehicle 142 is a southbound path of travel at a speed of 100 kilometers per hour. Additionally, the context information, having been obtained, can be stored in one or more of the first memory 154 of the first autonomous vehicle 148 or the third memory 172 of the cloud computing platform 168.

Returning to FIG. 2, at an operation 208, the processor can determine, based on the context information, an existence of an advantage to change an actual trajectory of the autonomous vehicle.

With reference to FIG. 1, in the first example, if: (1) the desired trajectory of the second autonomous vehicle 150 is to go straight; (2) the current time is Tuesday at 10:00 am; (3) the second vehicle 144 is in front of the second autonomous vehicle 150 in the left lane 116a; (4) in the left lane 116a, vehicles are allowed to make left turns or to go straight (LS) (e.g., the first pattern: LS/SO/RS); (5) on Tuesdays at 10:00 am, 70 percent of vehicles in the left lane 116a make left turns; and (6) in the center lane 116b, vehicles are allowed only to go straight (SO) (e.g., the first pattern: LS/SO/RS), then the second processor 160 of the second autonomous vehicle 150 can determine the existence of an advantage to change the actual trajectory of the second autonomous vehicle 150 to have a path of travel to the center lane 116b, which may allow the second autonomous vehicle 150 to go straight without a need to wait for the second vehicle 144 possibly to make a left turn. Additionally or alternatively, the second autonomous vehicle 150 may be able to communicate, via the third wireless communications device 166, with the second vehicle 144 to determine if the second vehicle 144 intends to make a left turn or to go straight. Additionally, the second processor 160 may obtain, from one or more of the third sensor 164 or the first sensor 136 supported by the post and beam cantilever 128, information to confirm that the center lane 116b will remain free of objects long enough for the second autonomous vehicle 150 to change the actual trajectory of the second autonomous vehicle 150 to have the path of travel to the center lane 116b.

In the second and fourth examples, if: (1) the desired trajectory of the first autonomous vehicle 148 is to make a left turn to the right lane 122b; (2) the second vehicle 144 is in the left lane 116a; (3) in the left lane 116a, vehicles are allowed only to make left turns (LO) (e.g., the second pattern: LO/LS/RS); and (4) the actual trajectory of 50 percent of vehicles in the left lane 116a is along the second candidate trajectory 116a-2 to the right lane 122b (rather than along the first candidate trajectory 116a-1 to the left lane 122a), then the first processor 152 of the first autonomous vehicle 148 can determine the existence of an advantage to change the actual trajectory of the first autonomous vehicle 148 to delay a commencement of the left turn until the first processor 152 can determine whether the actual trajectory of the second vehicle 144 will be along the first candidate trajectory 116a-1 to the left lane 122a or along the second candidate trajectory 116a-2 to the right lane 122b. Additionally or alternatively, the first autonomous vehicle 148 may be able to communicate, via the second wireless communications device 158, with the second vehicle 144 to determine if the second vehicle 144 intends to make a left turn along the first candidate trajectory 116a-1 to the left lane 122a or along the second candidate trajectory 116a-2 to the right lane 122b.

In the third example, if: (1) the desired trajectory of the first autonomous vehicle 148 is to go straight to the left lane 110a; (2) the warehouse 124 is located east of the first road 104, north of the intersection 102; (3) the first road 104, north of the intersection 102, includes the median 126; (4) the semi-trailer truck 140 is in the left lane 108a; and (5) 20 percent of the time in which a semi-trailer truck 140 is in the left lane 108a, the semi-trailer truck 140 makes a U-turn to the right lane 110b, then the first processor 152 of the first autonomous vehicle 148 can determine a lack of the existence of an advantage to change the actual trajectory of the first autonomous vehicle 148 because the percent of the time in which a semi-trailer truck 140 in the left lane 108a makes a U-turn to the right lane 110b is sufficiently low that the first autonomous vehicle 148 can operate in a reactive manner and use the second sensor 156 of the first autonomous vehicle 148 to avoid a collision with the semi-trailer truck 140. Additionally or alternatively, the first autonomous vehicle 148 may be able to communicate, via the second wireless communications device 158, with the semi-trailer truck 140 to determine if the semi-trailer truck 140 intends to make a U-turn to the right lane 110b.

In the fifth example, if: (1) the desired trajectory of the first autonomous vehicle 148 is to make a left turn to the right lane 122b; (2) the topological information about the south entrance point 116 to the intersection 102 includes the second pattern (i.e., LO/LS/RS); (3) the first vehicle 142 is in the right lane 108b, 100 meters from the north entrance point 108 to the intersection 102; and (4) the trajectory of first vehicle 142 is a southbound path of travel at a speed of 100 kilometers per hour, then the first processor 152 of the first autonomous vehicle 148 can determine the existence of an advantage to change the actual trajectory of the first autonomous vehicle 148 to delay a commencement of the left turn until the first vehicle 142 has passed through the intersection 102. Additionally or alternatively, the first autonomous vehicle 148 may be able to communicate, via the second wireless communications device 158, with the first vehicle 142 to determine if the first vehicle 142 intends to stop at the north entrance point 108 to the intersection of if the first vehicle 142 intends to change its speed.

Returning to FIG. 2, at an operation 210, the processor can cause, in response to a determination of the existence of the advantage, a change to the actual trajectory of the autonomous vehicle to occur. The change to the actual trajectory can include one or more of a change to a path of travel of the autonomous vehicle or a change to a speed of the autonomous vehicle.

With reference to FIG. 1, in the first example, the second processor 160 of the second autonomous vehicle 150 can cause the second autonomous vehicle 150 to change the actual trajectory of the second autonomous vehicle 150 to have the path of travel to the center lane 116b. In the second, fourth, and fifth examples, the first processor 152 of the first autonomous vehicle 148 can cause the first autonomous vehicle 148 to delay the commencement of the left turn.

Figure 3:
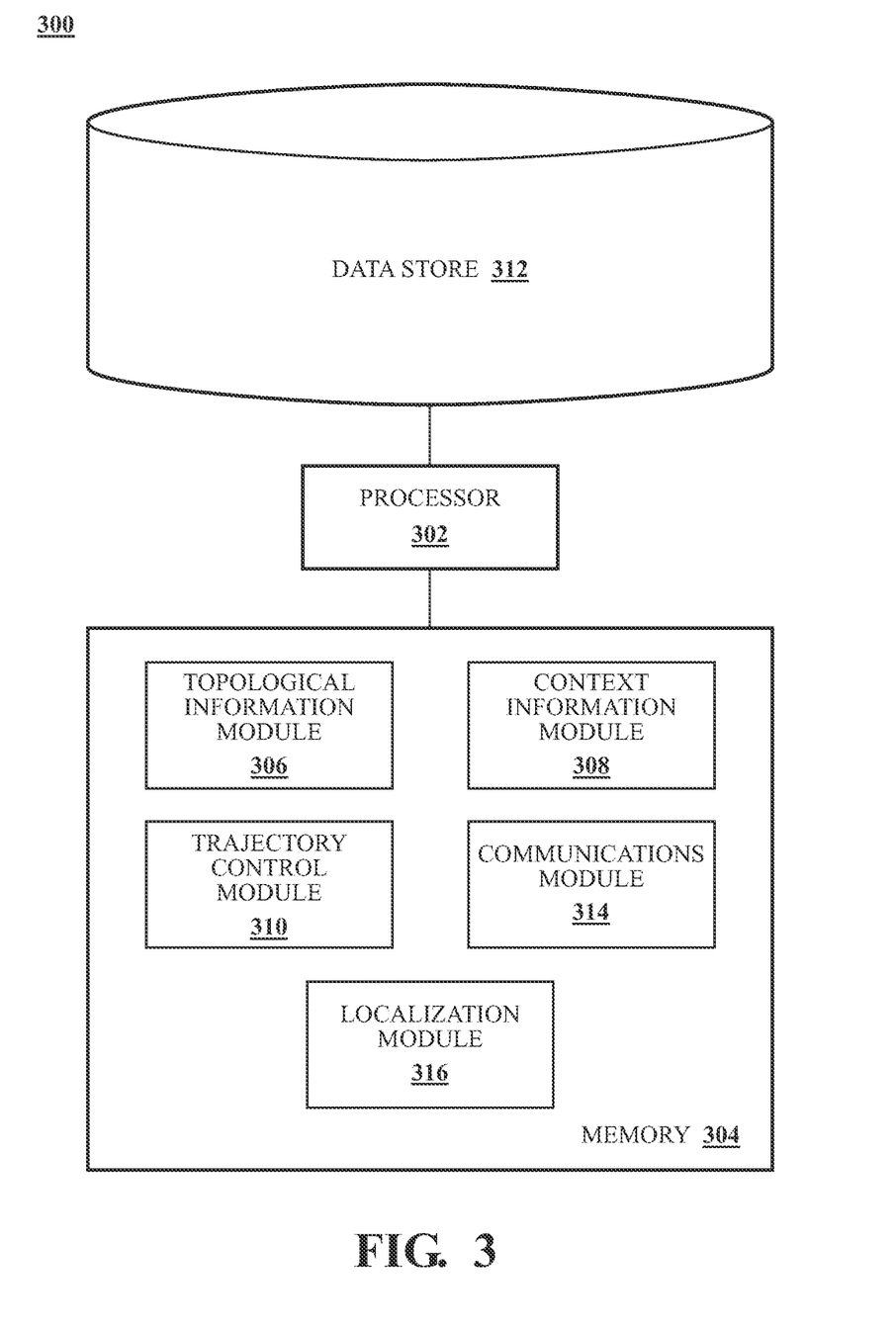
FIG. 3 is a block diagram that illustrates an example of a system for navigating an autonomous vehicle through an intersection, according to the disclosed technologies.

FIG. 3 is a block diagram that illustrates an example of a system 300 for navigating an autonomous vehicle through an intersection, according to the disclosed technologies. The system 300 can include, for example, a processor 302 and a memory 304. The memory 304 can be communicably coupled to the processor 302. The memory can store, for example, a topological information module 306, a context information module 308, and a trajectory control module 310.

For example, the topological information module 306 can include instructions that function to control the processor 302 to obtain topological information about the intersection. The topological information can include, for example, one or more of a count of a number of lanes on roads associated with the intersection, information about an entrance point to the intersection, or information about an exit point from the intersection.

In a first alternative implementation, the instructions of the topological information module 306 can function to control the processor 302 to: (1) receive, from a sensor disposed on one or more of the autonomous vehicle or another object, information about the intersection and (2) determine, based on the information about the intersection, the topological information. For example, the system 300 can further include a data store 312. The data store 312 can be communicably coupled to the processor 302. The topological information, having been determined, the instructions of the topological information module 306 can function to control the processor 302 to store the topological information in the data store 312. Additionally or alternatively, for example, the memory 304 can further store a communications module 314. The topological information, having been determined, the communications module 314 can include instructions that function to control the processor 302 to transmit the topological information to a cloud computing platform.

In a first realization of a second alternative implementation, the system 300 can further include the data store 312. The data store 312 can be communicably coupled to the processor 302. For example, the instructions of the topological information module 306 can function to control the processor 302 to retrieve the topological information from the data store 312. In a variation of the second alternative implementation, the instructions of the topological information module 306 can function to control the processor 302 to: (1) receive, from a sensor disposed on at least one of the autonomous vehicle or another object, additional information about the intersection; (2) determine, based on the additional information about the intersection, additional topological information; and (3) revise the topological information to incorporate the additional topological information. Additionally, in this variation, for example, the topological information, having been revised, the instructions of the topological information module 306 can function to control the processor 302 to store the topological information in the data store 312. Additionally or alternatively, in this variation, for example, the memory 304 can further store the communications module 314. The topological information, having been revised, the communications module 314 can include instructions that function to control the processor 302 to transmit the topological information to a cloud computing platform.

In a second realization of the second alternative implementation, the memory 304 can further store the communications module 314. The communications module 314 can include instructions that function to control the processor 302 to receive the topological information from a cloud computing platform. The instructions of the topological information module 306 can function to control the processor 302 to cause the communications module 314 to receive the topological information from the cloud computing platform. For example, the instructions of the topological information module 306 can function to control the processor 302 to: (1) receive, from a sensor disposed on at least one of the autonomous vehicle or another object, additional information about the intersection; (2) determine, based on the additional information about the intersection, additional topological information; and (3) revise the topological information to incorporate the additional topological information. Additionally, for example, the system 300 can further include the data store 312. The data store 312 can be communicably coupled to the processor 302. The topological information, having been revised, the instructions of the topological information module 306 can function to control the processor 302 to store the topological information in the data store 312. Additionally or alternatively, for example, the topological information, having been revised, the instructions of the communications module 314 can function to control the processor 302 to transmit the topological information to the cloud computing platform.

For example, the context information module 308 can include instructions that function to control the processor 302 to obtain, based on the topological information, context information about a candidate trajectory through the intersection. For example, the context information can be based on one or more of a current time or information about a position of an object with respect to the topological information. The object can be within a threshold distance to the autonomous vehicle. The threshold distance to the autonomous vehicle can be 300 meters.

In a first realization of a third alternative implementation, the system 300 can further include the data store 312. The data store 312 can be communicably coupled to the processor 302. For example, the instructions of the context information module 308 can function to control the processor 302 to retrieve the context information from the data store 312. Additionally, for example, the data store 312 can also store the topological information.

In a second realization of the third alternative implementation, the memory 304 can further store the communications module 314. The communications module 314 can include instructions that function to control the processor 302 to receive the context information from a cloud computing platform. For example, the instructions of the context information module 308 can function to control the processor 302 to cause the communications module 314 to receive the context information from the cloud computing platform. Additionally, for example, the cloud computing platform can also store the topological information.

In a fourth alternative implementation, the instructions of the context information module 308 can function to control the processor 302 to determine the context information. In a realization of the fourth alternative implementation, the instructions of the context information module 308 can function to control the processor 302 to: (1) obtain a position of an object within a threshold distance to the autonomous vehicle and (2) determine information about the position of the object with respect to the topological information. In a specific realization, the instructions of the context information module 308 can function to control the processor 302 to receive, from a sensor disposed on one or more of the autonomous vehicle or another object, the position of the object. For example, the threshold distance to the autonomous vehicle is 300 meters. Additionally, in the realization, the instructions of the context information module 308 can function to control the processor 302 to determine a trajectory of the object. Additionally, in the fourth alternative implementation, the system 300 can further include the data store 312. The data store 312 can be communicably coupled to the processor 302. For example, the context information, having been obtained, the instructions of the context information module 308 can function to control the processor 302 to store the context information in the data store 312. Additionally, for example, the data store 312 can also store the topological information. Additionally or alternatively, in the fourth alternative implementation, the memory 304 can further store the communications module 314. The context information, having been obtained, the communications module 314 can include instructions that function to control the processor 302 to transmit the context information to the cloud computing platform. Additionally, for example, the cloud computing platform can also store the topological information.

For example, the trajectory control module 310 can include instructions that function to control the processor 302 to: (1) determine, based on the context information, an existence of an advantage to change an actual trajectory of the autonomous vehicle and (2) cause, in response to a determination of the existence of the advantage, a change to the actual trajectory of the autonomous vehicle to occur. The change to the actual trajectory can include one or more of a change to a path of travel of the autonomous vehicle or a change to a speed of the autonomous vehicle.

Additionally, the memory 304 can further store, for example, a localization module 316. The localization module 316 can include instructions that function to control the processor 302 to determine that a location of the autonomous vehicle is within a threshold distance to the intersection. For example, the threshold distance can be 100 meters.

Figure 4:
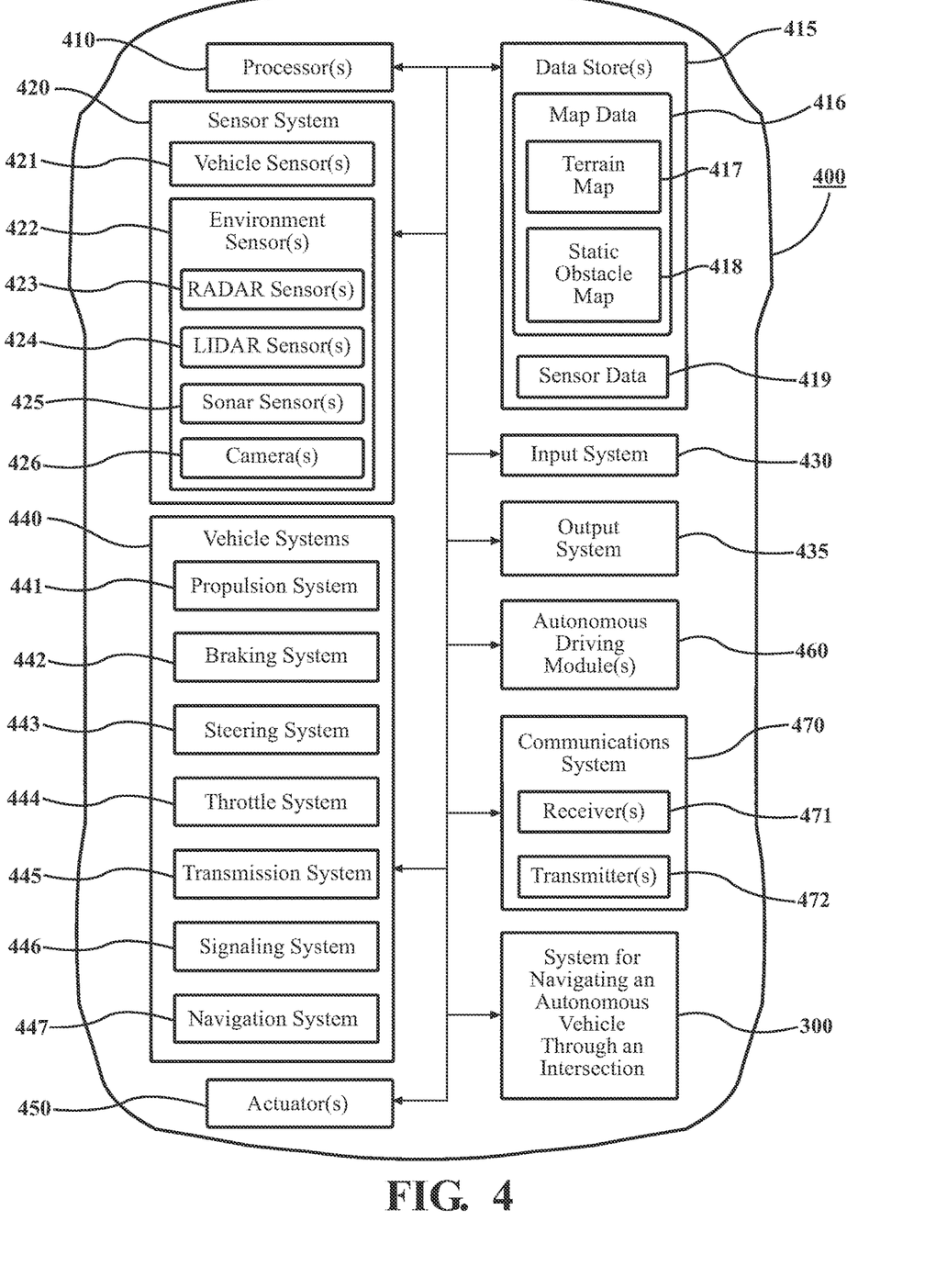
FIG. 4 includes a block diagram that illustrates an example of elements disposed on a vehicle, according to the disclosed technologies.

FIG. 4 includes a block diagram that illustrates an example of elements disposed on a vehicle 400, according to the disclosed technologies. As used herein, a "vehicle" can be any form of powered transport. In one or more implementations, the vehicle 400 can be an automobile. While arrangements described herein are with respect to automobiles, one of skill in the art understands, in light of the description herein, that embodiments are not limited to automobiles.

In some embodiments, the vehicle 400 can be configured to switch selectively between an autonomous mode, one or more semi-autonomous operational modes, and/or a manual mode. Such switching can be implemented in a suitable manner, now known or later developed. As used herein, "manual mode" can refer that all of or a majority of the navigation and/or maneuvering of the vehicle 400 is performed according to inputs received from a user (e.g., human driver). In one or more arrangements, the vehicle 400 can be a conventional vehicle that is configured to operate in only a manual mode.

In one or more embodiments, the vehicle 400 can be an autonomous vehicle. As used herein, "autonomous vehicle" can refer to a vehicle that operates in an autonomous mode. As used herein, "autonomous mode" can refer to navigating and/or maneuvering the vehicle 400 along a travel route using one or more computing systems to control the vehicle 400 with minimal or no input from a human driver. In one or more embodiments, the vehicle 400 can be highly automated or completely automated. In one embodiment, the vehicle 400 can be configured with one or more semi-autonomous operational modes in which one or more computing systems perform a portion of the navigation and/or maneuvering of the vehicle along a travel route, and a vehicle operator (i.e., driver) provides inputs to the vehicle 400 to perform a portion of the navigation and/or maneuvering of the vehicle 400 along a travel route.

The vehicle 400 can include various elements. The vehicle 400 can have any combination of the various elements illustrated in FIG. 4. In various embodiments, it may not be necessary for the vehicle 400 to include all of the elements illustrated in FIG. 4. Furthermore, the vehicle 400 can have elements in addition to those illustrated in FIG. 4. While the various elements are illustrated in FIG. 4 as being located within the vehicle 400, one or more of these elements can be located external to the vehicle 400. Furthermore, the elements illustrated may be physically separated by large distances. For example, as described, one or more components of the disclosed system can be implemented within the vehicle 400 while other components of the system can be implemented within a cloud-computing environment, as described below. For example, the elements can include one or more processors 410, one or more data stores 415, a sensor system 420, an input system 430, an output system 435, vehicle systems 440, one or more actuators 450, one or more autonomous driving modules 460, a communications system 470, and the system 300 for navigating an autonomous vehicle through an intersection.

In one or more arrangements, the one or more processors 410 can be a main processor of the vehicle 400. For example, the one or more processors 410 can be an electronic control unit (ECU). For example, functions and/or operations of the processor 302 (illustrated in FIG. 3) can be realized by the one or more processors 410.

The one or more data stores 415 can store, for example, one or more types of data. For example, functions and/or operations of the memory 304 and/or the data store 312 (illustrated in FIG. 3) can be realized by the one or more data stores 415. The one or more data store 415 can include volatile memory and/or non-volatile memory. Examples of suitable memory for the one or more data stores 415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 415 can be a component of the one or more processors 410. Additionally or alternatively, the one or more data stores 415 can be operatively connected to the one or more processors 410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 415 can store map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain maps 417. The one or more terrain maps 417 can include information about the ground, terrain, roads, surfaces, and/or other features of one or more geographic areas. The one or more terrain maps 417 can include elevation data of the one or more geographic areas. The map data 416 can be high quality and/or highly detailed. The one or more terrain maps 417 can define one or more ground surfaces, which can include paved roads, unpaved roads, land, and other things that define a ground surface.

In one or more arrangements, the map data 416 can include one or more static obstacle maps 418. The one or more static obstacle maps 418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 418 can have location data, size data, dimension data, material data, and/or other data associated with them. The one or more static obstacle maps 418 can include measurements, dimensions, distances, and/or information for one or more static obstacles. The one or more static obstacle maps 418 can be high quality and/or highly detailed. The one or more static obstacle maps 418 can be updated to reflect changes within a mapped area.

In one or more arrangements, the one or more data stores 415 can store sensor data 419. As used herein, "sensor data" can refer to any information about the sensors with which the vehicle 400 can be equipped including the capabilities of and other information about such sensors. The sensor data 419 can relate to one or more sensors of the sensor system 420. For example, in one or more arrangements, the sensor data 419 can include information about one or more lidar sensors 424 of the sensor system 420.

In some arrangements, at least a portion of the map data 416 and/or the sensor data 419 can be located in one or more data stores 415 that are located onboard the vehicle 400. Alternatively or additionally, at least a portion of the map data 416 and/or the sensor data 419 can be located in one or more data stores 415 that are located remotely from the vehicle 400.

The sensor system 420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the one or more processors 410, the one or more data stores 415, and/or another element of the vehicle 400 (including any of the elements illustrated in FIG. 4). The sensor system 420 can acquire data of at least a portion of the external environment of the vehicle 400 (e.g., nearby vehicles). The sensor system 420 can include any suitable type of sensor. Various examples of different types of sensors are described herein. However, one of skill in the art understands that the embodiments are not limited to the particular sensors described herein.

The sensor system 420 can include one or more vehicle sensors 421. The one or more vehicle sensors 421 can detect, determine, and/or sense information about the vehicle 400 itself. In one or more arrangements, the one or more vehicle sensors 421 can be configured to detect and/or sense position and orientation changes of the vehicle 400 such as, for example, based on inertial acceleration. In one or more arrangements, the one or more vehicle sensors 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The one or more vehicle sensors 421 can be configured to detect and/or sense one or more characteristics of the vehicle 400. In one or more arrangements, the one or more vehicle sensors 421 can include a speedometer to determine a current speed of the vehicle 400.

Alternatively or additionally, the sensor system 420 can include one or more environment sensors 422 configured to acquire and/or sense driving environment data. As used herein, "driving environment data" can include data or information about the external environment in which a vehicle is located or one or more portions thereof. For example, the one or more environment sensors 422 can be configured to detect, quantify, and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400 such as, for example, lane markers, signs, traffic lights, traffic signs, lane lines, crosswalks, curbs proximate the vehicle 400, off-road objects, etc.

Various examples of sensors of the sensor system 420 are described herein. The example sensors may be part of the one or more vehicle sensors 421 and/or the one or more environment sensors 422. However, one of skill in the art understands that the embodiments are not limited to the particular sensors described.

In one or more arrangement, the one or more environment sensors 422 can include one or more radar sensors 423, one or more lidar sensors 424, one or more sonar sensors 425, and/or one more cameras 426. In one or more arrangements, the one or more cameras 426 can be one or more high dynamic range (HDR) cameras or one or more infrared (IR) cameras. For example, the one or more cameras 426 can be used to record a reality of a state of an item of information that can appear in digital map. For example, functions and/or operations of the detection and ranging device 114 (illustrated in FIGS. 1 and 2) can be realized by one of the one or more environment sensors 422.

The input system 430 can include any device, component, system, element, arrangement, or groups thereof that enable information/data to be entered into a machine. The input system 430 can receive an input from a vehicle passenger (e.g., a driver or a passenger). The output system 435 can include any device, component, system, element, arrangement, or groups thereof that enable information/data to be presented to a vehicle passenger (e.g., a driver or a passenger).

Various examples of the one or more vehicle systems 440 are illustrated in FIG. 4. However, one of skill in the art understands that the vehicle 400 can include more, fewer, or different vehicle systems. Although particular vehicle systems can be separately defined, each or any of the systems or portions thereof may be otherwise combined or segregated via hardware and/or software within the vehicle 400. For example, the one or more vehicle systems 440 can include a propulsion system 441, a braking system 442, a steering system 443, a throttle system 444, a transmission system 445, a signaling system 446, and/or the navigation system 447. Each of these systems can include one or more devices, components, and/or a combination thereof, now known or later developed.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, a geolocation system, and/or a combination thereof.

The one or more actuators 450 can be any element or combination of elements operable to modify, adjust, and/or alter one or more of the vehicle systems 440 or components thereof responsive to receiving signals or other inputs from the one or more processors 410 and/or the one or more autonomous driving modules 460. Any suitable actuator can be used. For example, the one or more actuators 450 can include motors, pneumatic actuators, hydraulic pistons, relays, solenoids, and/or piezoelectric actuators.

The one or more processors 410 and/or the one or more autonomous driving modules 460 can be operatively connected to communicate with the various vehicle systems 440 and/or individual components thereof. For example, the one or more processors 410 and/or the one or more autonomous driving modules 460 can be in communication to send and/or receive information from the various vehicle systems 440 to control the movement, speed, maneuvering, heading, direction, etc. of the vehicle 400. The one or more processors 410 and/or the one or more autonomous driving modules 460 may control some or all of these vehicle systems 440 and, thus, may be partially or fully autonomous.

The one or more processors 410 and/or the one or more autonomous driving modules 460 may be operable to control the navigation and/or maneuvering of the vehicle 400 by controlling one or more of the vehicle systems 440 and/or components thereof. For example, when operating in an autonomous mode, the one or more processors 410 and/or the one or more autonomous driving modules 460 can control the direction and/or speed of the vehicle 400. The one or more processors 410 and/or the one or more autonomous driving modules 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 470 can include one or more receivers 471 and/or one or more transmitters 472. The communications system 470 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 470 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network"

(V2N) technology. "Vehicle to Everything" (V2X) technology can integrate aspects of these individual communications technologies.

The vehicle 400 can include one or more modules, at least some of which are described herein. The modules can be implemented as computer-readable program code that, when executed by the one or more processors 410, implement one or more of the various processes described herein. One or more of the modules can be a component of the one or more processors 410. Alternatively or additionally, one or more of the modules can be executed on and/or distributed among other processing systems to which the one or more processors 410 can be operatively connected. The modules can include instructions (e.g., program logic) executable by the one or more processors 410. Alternatively or additionally, the one or more data store 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include one or more autonomous driving modules 460. The one or more autonomous driving modules 460 can be configured to receive data from the sensor system 420 and/or any other type of system capable of capturing information relating to the vehicle 400 and/or the external environment of the vehicle 400. In one or more arrangements, the one or more autonomous driving modules 460 can use such data to generate one or more driving scene models. The one or more autonomous driving modules 460 can determine position and velocity of the vehicle 400. The one or more autonomous driving modules 460 can determine the location of obstacles, obstacles, or other environmental features including traffic signs, trees, shrubs, neighboring vehicles, pedestrians, etc.

The one or more autonomous driving modules 460 can be configured to receive and/or determine location information for obstacles within the external environment of the vehicle 400 for use by the one or more processors 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The one or more autonomous driving modules 460 can be configured to determine one or more travel paths, current autonomous driving maneuvers for the vehicle 400, future autonomous driving maneuvers and/or modifications to current autonomous driving maneuvers based on data acquired by the sensor system 420, driving scene models, and/or data from any other suitable source such as determinations from the sensor data 419. As used herein, "driving maneuver" can refer to one or more actions that affect the movement of a vehicle. Examples of driving maneuvers include: accelerating, decelerating, braking, turning, moving in a lateral direction of the vehicle 400, changing travel lanes, merging into a travel lane, and/or reversing, just to name a few possibilities. The one or more autonomous driving modules 460 can be configured to implement determined driving maneuvers. The one or more autonomous driving modules 460 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The one or more autonomous driving modules 460 can be configured to execute various vehicle functions and/or to transmit data to, receive data from, interact with, and/or control the vehicle 400 or one or more systems thereof (e.g., one or more of vehicle systems 440). For example, functions and/or operations of an automotive navigation system can be realized by the one or more autonomous driving modules 460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 2-4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for navigating an autonomous vehicle through an intersection, the system comprising:
   one or more processors; and
   a memory communicably coupled to the one or more processors and storing:
     a localization module that when executed by the one or more processors cause the one or more processors to determine that a location of the autonomous vehicle is within a threshold distance to the intersection;
     a topological information module including instructions that when executed by the one or more processors cause the one or more processors to obtain, after a determination that the location is within the threshold distance, topological information about the intersection;
     a context information module including instructions that when executed by the one or more processors cause the one or more processors to obtain, based on the topological information, context information about a candidate trajectory through the intersection; and
     a trajectory control module including instructions that when executed by the one or more processors cause the one or more processors to:
       determine, based on the context information, a change to an actual trajectory of the autonomous; vehicle, the change being one of:
         an avoidance of a delay in a movement of the autonomous vehicle in response to a determination of an existence of a low likelihood of a collision, and
         an insertion of the delay in the movement of the autonomous vehicle in response to a determination of an absence of the existence of the low likelihood of the collision; and
       cause the change to the actual trajectory of the autonomous vehicle to occur.

2. The system of claim 1, wherein the instructions of the topological information module to obtain the topological information cause the one or more processors to:
   receive, from a sensor disposed on at least one of the autonomous vehicle or another object, information about the intersection; and
   determine, based on the information about the intersection, the topological information.

3. The system of claim 2, further comprising a data store communicably coupled to the one or more processors, wherein the instructions of the topological information module cause the one or more processors to store the topological information in the data store.

4. The system of claim 2, wherein the memory further stores a communications module that when executed by the one or more processors cause the one or more processors to transmit the topological information to a cloud computing platform.

5. The system of claim 1, further comprising a data store communicably coupled to the one or more processors, wherein the instructions of the topological information module to obtain the topological information cause the one or more processors to retrieve the topological information from the data store.

6. The system of claim 5, wherein the instructions of the topological information module cause the one or more processors to:
receive, from a sensor disposed on at least one of the autonomous vehicle or another object, additional information about the intersection;
determine, based on the additional information about the intersection, additional topological information; and
revise the topological information to incorporate the additional topological information.

7. The system of claim 1, wherein:
the memory further stores a communications module that when executed by the one or more processors cause the one or more processors to receive the topological information from a cloud computing platform; and
the instructions of the topological information module cause the one or more processors to cause the communications module to receive the topological information from the cloud computing platform.

8. The system of claim 1, further comprising a data store communicably coupled to the one or more processors, wherein the instructions of the context information module cause the one or more processors to retrieve the context information from the data store.

9. The system of claim 1, wherein:
the memory further stores a communications module that when executed by the one or more processors cause the one or more processors to receive the context information from a cloud computing platform; and
the instructions of the context information module cause the one or more processors to cause the communications module to receive the context information from the cloud computing platform.

10. The system of claim 1, wherein the instructions of the context information module cause the one or more processors to:
obtain a position of an object within a threshold distance to the autonomous vehicle; and
determine information about the position of the object with respect to the topological information.

11. The system of claim 10, wherein the instructions of the context information module cause the one or more processors to receive, from a sensor disposed on at least one of the autonomous vehicle or another object, the position of the object.

12. The system of claim 10, wherein the instructions of the context information module further cause the one or more processors to determine a trajectory of the object.

13. The system of claim 10 wherein:
the memory further stores a communications module that when executed by the one or more processors cause the one or more processors to transmit the context information to a cloud computing platform; and
the instructions of the context information module cause the one or more processors to cause the communications module to transmit the context information to the cloud computing platform.

14. The system of claim 1, wherein the topological information includes information, for a lane at the intersection, about at least one path of travel vehicles are allowed to make from the lane through the intersection.

15. The system of claim 14, wherein the at least one path of travel comprises at least one a left turn, straight, or a right turn.

16. The system of claim 1, wherein the context information is based on historical information related to the intersection and vehicles that have navigated through the intersection.

17. A method for navigating an autonomous vehicle through an intersection, the method comprising:
determining, by a processor, that a location of the autonomous vehicle is within a threshold distance to the intersection;
obtaining, by the processor and after a determination that the location is within the threshold distance, topological information about the intersection;
obtaining, by the processor and based on the topological information, context information about a candidate trajectory through the intersection;
determining, by the processor and based on the context information, a change to an actual trajectory of the autonomous vehicle, the change being one of:
an avoidance of a delay in a movement of the autonomous vehicle in response to a determination of an existence of a low likelihood of a collision, and
an insertion of the delay in the movement of the autonomous vehicle in response to a determination of an absence of the existence of the low likelihood of the collision; and
causing, by the processor and in response to a determination of the existence of the advantage, a processor, the change to the actual trajectory of the autonomous vehicle to occur.

18. The method of claim 17, wherein the obtaining the topological information comprises retrieving the topological information from a memory.

19. The method of claim 18, wherein the obtaining the topological information further comprises:
receiving, from a sensor disposed on at least one of the autonomous vehicle or another object, additional information about the intersection;
determining, based on the additional information about the intersection, additional topological information; and
revising the topological information to incorporate the additional topological information.

20. A non-transitory computer-readable medium for navigating an autonomous vehicle through an intersection, the non-transitory computer-readable medium including instructions that when executed by one or more processors cause the one or more processors to:
determine that a location of the autonomous vehicle is within a threshold distance to the intersection;
obtain, after a determination that the location is within the threshold distance, topological information about the intersection;
obtain, based on the topological information, context information about a candidate trajectory through the intersection;
determine, based on the context information, to a change to an actual trajectory of the autonomous vehicle, the change being one of:
an avoidance of a delay in a movement of the autonomous vehicle in response to a determination of an existence of a low likelihood of a collision, and
an insertion of the delay in the movement of the autonomous vehicle in response to a determination of an absence of the existence of the low likelihood of the collision; and cause the change to the actual trajectory of the autonomous vehicle to occur.

\* \* \* \* \*

UNITED STATES PATENT AND TRADEMARK OFFICE
CERTIFICATE OF CORRECTION

| | |
|---|---|
| PATENT NO. | : 11,760,379 B2 |
| APPLICATION NO. | : 17/145767 |
| DATED | : September 19, 2023 |
| INVENTOR(S) | : Wolfram Burgard and Ryan W. Wolcott |

It is certified that error appears in the above-identified patent and that said Letters Patent is hereby corrected as shown below:

In the Claims

Column 22, Claim 17, Lines 26 and 27: delete "processor and in response to a determination of the existence of the advantage, a".

Signed and Sealed this
Seventeenth Day of October, 2023

Katherine Kelly Vidal
*Director of the United States Patent and Trademark Office*